Patented May 25, 1948

2,442,137

UNITED STATES PATENT OFFICE 2,442,137

METHOD OF MAKING ALKALI METAL ALUMINATE

Lawrence S. Lynn, Jr., St. Louis, Mo., and Edwin L. Shirley, East St. Louis, Ill., assignors to Aluminum Company of America, Pittsburgh, Pa., a corporation of Pennsylvania No Drawing. Application June 2, 1945, Serial No. 597,376

3 Claims. (Cl. 23—52)

This invention relates to the recovery of aluminum values from wastes, principally composed of mixtures of aluminum and aluminum oxide. One common form of such a waste is known as dross and is the direct result of the propensity of molten aluminum, or alloys containing large amounts of that metal, to oxidize when exposed to the atmosphere. Besides its principal content of aluminum and aluminum oxide, dross usually contains impurities including nitrides and carbides and varies in composition according to origin. Physically, dross is a hard, brittle, porous, and often loosely knit, agglomerated mass which in many forms is readily reduced by impact or grinding to the form of pellets or coarse powder. Foundry or melting operations involving the handling of molten aluminum or aluminum base alloy in large quantities produce, as waste product, considerable amounts of this dross with consequent waste of aluminum values.

Processes of recovering these aluminum values from dross have not been entirely successful, particularly from the standpoint of cost and efficiency. The processes previously used may be generally classed as thermal and chemical. In thermal operations the dross is heated, usually with the aid of fluxing and mechanical agitation, to melt from the dross the metallic aluminum content thereof. Such operations recover only a portion of the metallic aluminum values and do not recover any of the aluminum values which are present in the form of an oxide. The chemical methods heretofore proposed for removing aluminum values from dross have been inefficient and expensive. The most satisfactory process has consisted in mixing the dross with an alkali metal carbonate, usually soda ash, and heating the mixture to induce a reaction which will result in the production of soluble alkali metal aluminate from which aluminum hydrate may be recovered. Such a process is workable but has disadvantages, many of which arise from the highly exothermic nature of the reaction, the reaction being so violent that control thereof in a continuous, or even in a batch, process is very difficult and requires special and expensive equipment. To prevent the over-heating of the reaction mass by the heat of reaction in such a process, it has been found necessary to add to the reactants an inert diluent, such as diaspore or precipitated aluminum hydrate. By this means fairly satisfactory temperature control may be obtained, but the expense attendant upon the use of these diluents is relatively high, and the efficiency of the reaction is not that desirable in the treatment of a bulky, low value waste product such as dross.

One object of the present invention is the provision of an inexpensive, efficient chemical process by which the aluminum values contained in the dross may be converted into a soluble alkali metal aluminate. A further object is the provision of a chemical process for this purpose which is adaptable for controlled continuous commercial operation without the use of special types of equipment. To these ends the methods of this invention utilize the reaction between dross and alkali metal carbonate but with such modifications and under such conditions that the difficulties heretofore encountered are largely eliminated.

The first step taken in the practice of the improved method of this invention is the formation of a mixture of dross and alkali metal carbonate, the relatively cheap soda ash of commerce being the preferred carbonate material. As a second step, this mixture is placed in a pug mill or other convenient mixing device and is there mixed thoroughly with an aqueous solution of caustic soda or other alkali metal hydroxide. As a third step, the mixture thus formed is fed into a kiln where it is heated to temperatures sufficient to promote the formation of alkali metal aluminate. The resultant product may be used directly as a source of alkali metal aluminate, but if it is desired to obtain a purer material, the product is then, as a fourth step, leached with water or with an alkaline solution to dissolve the soluble aluminate from such insoluble impurities as may be present. From this brief outline it will be noted that the process of this invention differs from prior processes in that the dross-alkali metal carbonate mixture is, prior to heating, thoroughly mixed with an amount of alkali metal hydroxide. The addition of this step to the process results in several advantages including a higher average recovery of aluminum values from the dross and elimination of the highly exothermic characteristics of the reaction. Thus, for example, a dross which should theoretically yield 78 per cent soluble alkali metal aluminate, when mixed with alkali metal carbonate and heated actually yielded but 65 per cent soluble alkali metal aluminate whereas when the mixture of dross and carbonate was, in accordance with the improved methods of this invention, thoroughly mixed with a solution of alkali metal hydroxide and then heated, the reaction mixture contained about 77 per cent soluble alkali metal aluminate—a recovery of almost 100 per cent of the theoretical available values. Also, whereas the reaction between the dross and alkali metal carbonate is highly exothermic and relatively uncontrollable in the first instances, the reaction between the dross and alkali metal carbonate which had been previously mixed with alkali metal hydroxide proceeds without evolution of any large amounts of heat. For instance, a comparison of the temperatures of the two reaction masses, similar except that one was premixed with caustic soda solution, ten minutes after introduction of the mass into a kiln heated to about 1800° F. showed that in that time the temperature of the reaction mass produced in accordance with this invention rose to only 1800° F., whereas the reaction mass consisting merely of dross and alkali metal carbonate reached a temperature of about 2200° F.

In the practice of this invention it is preferred to reduce the dross or similar waste to the form of a powder, such as will pass an 8 mesh screen. This powder is then blended with a quantity of alkali metal carbonate. The amount of carbonate used will be measured by the total materials available to react therewith during subsequent heating, as described below, to form alkali metal aluminate. The use of amounts of carbonate less than that required to theoretically produce alkali metal aluminate with these available materials will result in an inefficient operation, since only a portion of the available materials will be converted to the aluminate. Theoretical proportions are, therefore, desirable and greatest efficiency is obtained when the mixture of dross and alkali metal carbonate contains 5 to 10 per cent in excess of the carbonate content indicated by theoretical calculations.

This mixture having been thoroughly blended, as by treatment in a standard mixer, it is then delivered to another mixer where it is mixed with a quantity of alkali metal hydroxide which is delivered to the mix in the form of a solution. It is desirable to use relatively high concentrations of the alkali metal hydroxide in the solution. Usually a solution containing at least 5 per cent by weight of hydroxide will be satisfactory. The total amount of alkali metal hydroxide which should be delivered to this mixing step may be as small as 10 per cent by weight of the total uncombined aluminum content of the dross. Amounts of hydroxide higher than about 50 per cent by weight of the total uncombined aluminum appear to be unnecessary but may be used. An amount of hydroxide sufficient to react with 25 to 50 per cent of the uncombined aluminum in the dross has given very efficient results. The addition of this hydroxide solution in the dross-alkali-metal carbonate mixture should be accompanied by very thorough mixing for a period of time which is usually in the order of 5 to 15 minutes but may be longer.

After the mixing is complete, the resulting alkali metal carbonate-dross-alkali metal hydroxide mixture is delivered to a kiln or furnace where it is heated to temperatures at which reaction between the components will form alkali metal aluminate. Such temperatures should exceed about 1500° F. but preferably do not exceed 2500° F. If these steps are practiced as above described and in the order named, the highly thermic nature of the reaction which takes place between the alkali metal carbonate and the dross will be considerably reduced, if not entirely eliminated, and the reaction will proceed quietly and at temperatures which can be controlled.

Dross and other similar waste composed principally of aluminum oxide and aluminum will, according to their origin, vary considerably in their content of metallic aluminum. In the practice of this invention I have found it desirable for the obtainment of the most efficient results to use a dross or similar waste which does not contain more than about 30 per cent by weight of uncombined aluminum. Where a dross contains more than this amount and it is desired to reduce its aluminum content to 30 per cent or less, this may be conveniently handled by mixing with drosses having lower aluminum values, if such are available, or by adding other waste products containing aluminum oxide to the dross or by otherwise balancing the composition of the starting material so that its uncombined aluminum values do not represent more than about 30 per cent of the total material. When less efficient conditions may be tolerated such adjustment of aluminum values may not be desirable.

As an example of the application of my invention, I cite an instance where the dross under treatment had the following analysis (all figures representing per cent by weight):

| | |
|---|---|
| Metallic aluminum | 30.1 |
| Aluminum carbide | 1.17 |
| Aluminum nitride | 19.7 |
| Silicon dioxide | 5.37 |
| Ferric oxide | 1.60 |
| Titanium oxide | 0.21 |
| Magnesium oxide | 9.61 |
| Aluminum oxide | 24.84 |
| Balance—undetermined. | |

430 pounds of this dross was mixed with 490 pounds of soda ash. The mixture was then placed in a pug mill and there was fed to it 93.4 gallons of a solution of sodium hydroxide containing 6.2 per cent free NaOH and about 10.3 per cent of $Na_2CO_3$. This solution was fed to the mixture at the rate of 5.4 gallons per minute and the total time of mixing in the pug mill was 7 minutes. Thereafter the mixture was transferred to a kiln which was initially at a temperature of 1275° F. and was held in said kiln for one and three-quarters hours during which time the reactants reached a temperature of about 2100° F. The resultant product contained 80 per cent of soluble alkali metal aluminate indicating a conversion of 97.6 per cent of the total aluminous material available in the original dross to soluble alkali metal aluminate.

Having thus described our invention, what we claim is:

1. In the process of recovering aluminum values from wastes composed of mixtures of metallic aluminum and aluminum oxide which comprises forming a mixture of said wastes and alkali metal carbonate and heating the thus formed mixture to temperatures sufficient to promote formation of alkali metal aluminate, the improvement consisting in mixing with said mixture, prior to heating the same, an aqueous solution of alkali metal hydroxide.

2. In the process of recovering aluminum values from wastes composed of mixtures containing metallic aluminum and aluminum oxide, which comprises forming a mixture of said wastes and alkali metal carbonate and heating the mixture to temperatures sufficient to promote the formation of alkali metal aluminate, the improvement consisting in providing a mixture containing alkali metal carbonate in amounts which are at least 5 per cent in excess of that required to theoretically react with the available aluminum values in said wastes, and, prior to heating said mixture, mixing the thus formed mixture with an aqueous solution of alkali metal hydroxide.

3. In the process of recovering aluminum values from wastes composed of metallic aluminum and aluminum oxide, which comprises forming a mixture of said wastes and alkali metal carbonate and heating the thus formed mixture to temperatures sufficient to promote formation of alkali metal aluminate, the improvement consisting in mixing with said mixture, prior to heating the same, an aqueous solution of alkali metal hydroxide, heating the resultant mixture to react the same, and leaching the reacted product to remove aluminum values therefrom.

LAWRENCE S. LYNN, JR.
EDWIN L. SHIRLEY.

REFERENCES CITED

The following references are of record in the file of this patent:

UNITED STATES PATENTS

| Number | Name | Date |
| --- | --- | --- |
| 382,505 | Bayer | May 8, 1888 |
| 1,156,606 | Lawrie | Oct. 12, 1915 |
| 1,471,751 | Rankin | Oct. 23, 1923 |
| 1,747,759 | Dorr et al. | Feb. 18, 1930 |
| 1,930,271 | Heiser | Oct. 10, 1933 |
| 2,066,209 | Lurie | Dec. 29, 1936 |
| 2,107,919 | Turner et al. | Feb. 8, 1938 |
| 2,345,134 | Lindsay | Mar. 28, 1944 |

FOREIGN PATENTS

| Number | Country | Date |
| --- | --- | --- |
| 404,028 | Great Britain | Jan. 8, 1934 |